Figure 1:
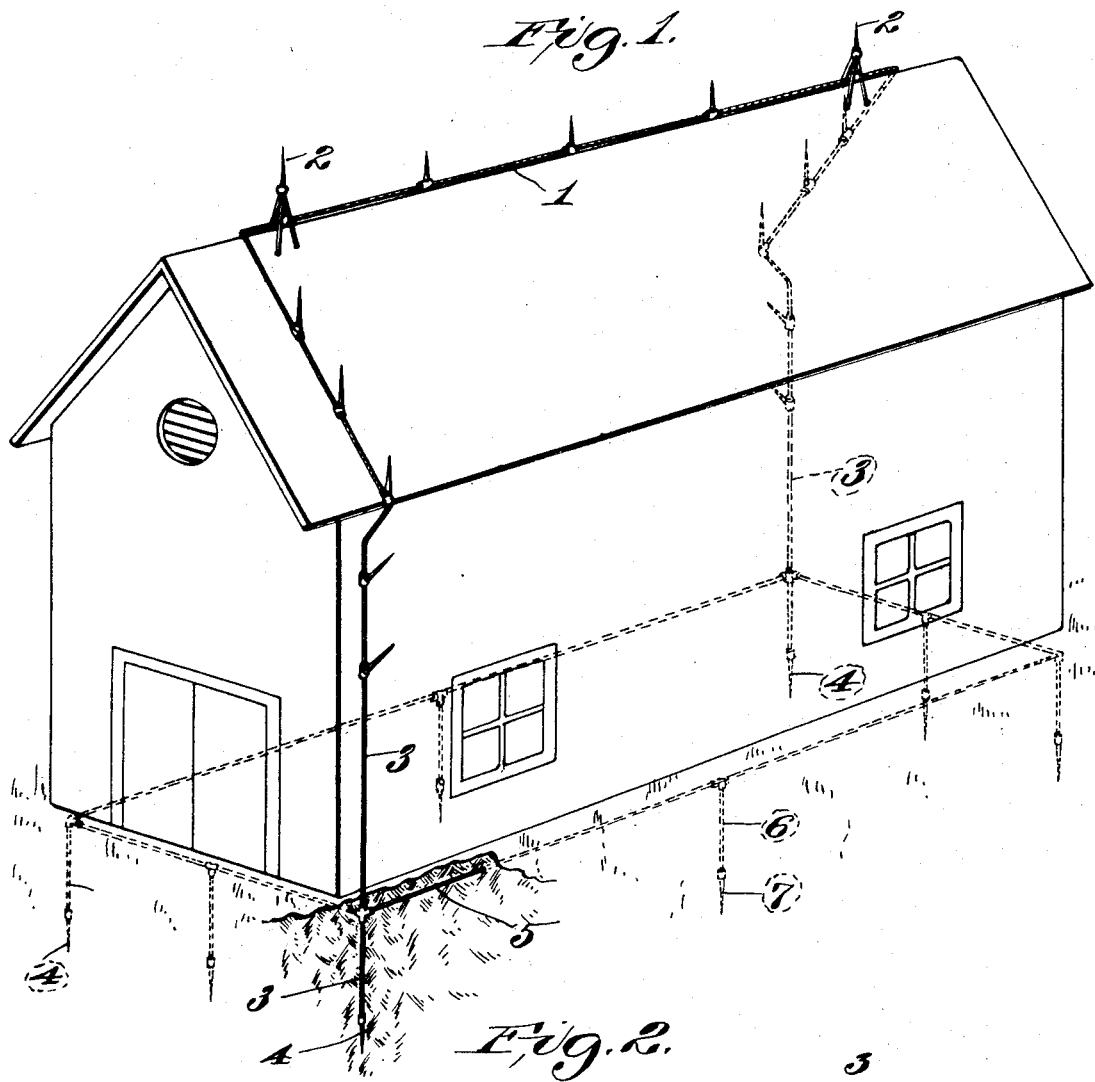

S. D. KRETZER.
LIGHTNING ROD.
APPLICATION FILED JULY 9, 1913.

1,098,738.

Patented June 2, 1914.

Attest:
Wm. Scott
R. M. Lawrence

Inventor:
Sidney D. Kretzer,
by Rippey & Kingsland,
Attys.

UNITED STATES PATENT OFFICE.

SIDNEY D. KRETZER, OF ST. LOUIS, MISSOURI.

LIGHTNING-ROD.

1,098,738. Specification of Letters Patent. Patented June 2, 1914.

Application filed July 9, 1913. Serial No. 778,028.

*To all whom it may concern:*

Be it known that I, SIDNEY D. KRETZER, a citizen of the United States, residing in the city of St. Louis and State of Missouri, have invented a new and useful Lightning-Rod, of which the following is a specification.

This invention relates to lightning rods and consists in the novel arrangement of constructing lightning rods upon buildings whereby the rod circuit is efficiently grounded, resulting in a more adequate protection of the building from damage by lightning.

An object of the invention is to provide an efficient grounding of the lightning rod circuit and to generally improve the efficiency of the system of lightning rods.

With this object in view I have provided a system of lightning rods arranged and constructed in the manner illustrated in the drawings in which—

Figure 2:
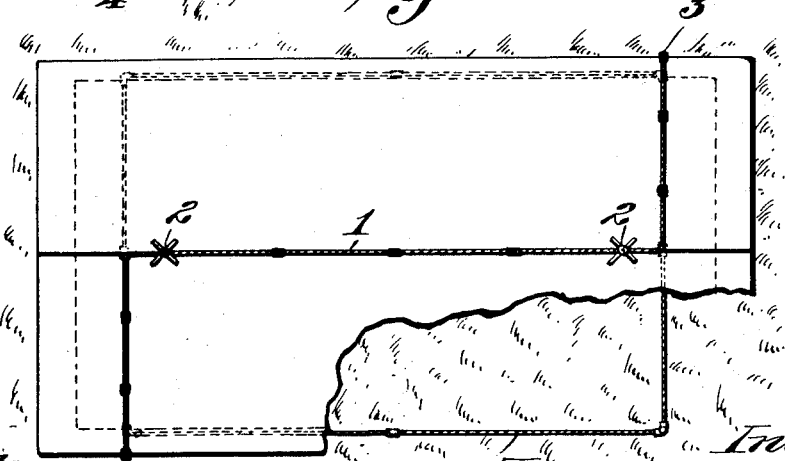

Figure 1 is a perspective view illustrating the complete system of the present invention erected upon a building, and Fig. 2 is a plan view, a portion of the building being broken away to show more clearly the arrangement of the ground circuit.

In the embodiment illustrated in the drawings 1 indicates the building circuit which may be constructed upon the superstructure of the building in any desired manner, and which is provided with upwardly projecting points 2 arranged at suitable intervals upon the conductor. The main building circuit is provided with ground leads or terminals 3 having points 4 upon their lower extremity. In the construction of the main building circuit it is preferable to erect the system in such a manner that the ground leads will be embedded in the ground at diagonal corners of the building, said leads extending into the ground far enough to come in contact with permanently moist earth which, in practice in most localities, would be about seven feet.

It is recognized in the art that the efficiency of the system depends to a great degree upon the grounding of the main circuit, and in order to provide an efficient means for effecting the grounding of the main house circuit I provide a supplemental ground circuit 5 which extends about the building and is connected with each of the down leads 3. The supplemental ground circuit may be placed below the surface of the earth or may be above the earth as desired, so long as the ground leads of the main circuit are electrically connected. At frequent intervals upon the supplemental ground circuit I provide a plurality of downwardly extending ground leads 6 which are provided with points 7 and which are each embedded in the ground to a sufficient depth so that the points 7 will be in permanent contact with moist earth.

Having thus fully described my invention what I claim and desire to secure by Letters Patent is;

1. A system of lightning rods adapted to be erected upon a building comprising a main building circuit, lightning rod points projecting upwardly from said circuit and being spaced at suitable intervals, a supplemental ground circuit connecting the down leads of said main circuit and extending about the building whereon said main circuit is erected, and a plurality of ground terminals extending from said supplemental ground circuit and adapted to contact with moist earth below the surface, substantially as specified.

2. In a system of lightning rods the combination with a main circuit adapted to be erected upon a building and provided with points, of a supplemental ground circuit electrically connecting each end of said main circuit, and a series of down leads extending into the earth and electrically connected to said supplemental ground circuit, substantially as specified.

3. A system of lightning rods comprising a main circuit, in combination with a supplemental ground circuit closing said main circuit and a series of pointed ground leads electrically connected to said supplemental ground circuit adapted to be embedded below the surface of the earth, substantially as specified.

In witness whereof, I have signed this specification in the presence of two subscribing witnesses.

SIDNEY D. KRETZER.

Witnesses:
L. C. KINGSLAND,
R. M. LAWRENCE.